Jan. 19, 1932.  W. H. SMITH  1,841,555
MOTOR CONTROL SYSTEM
Filed Sept. 24, 1926  2 Sheets-Sheet 2

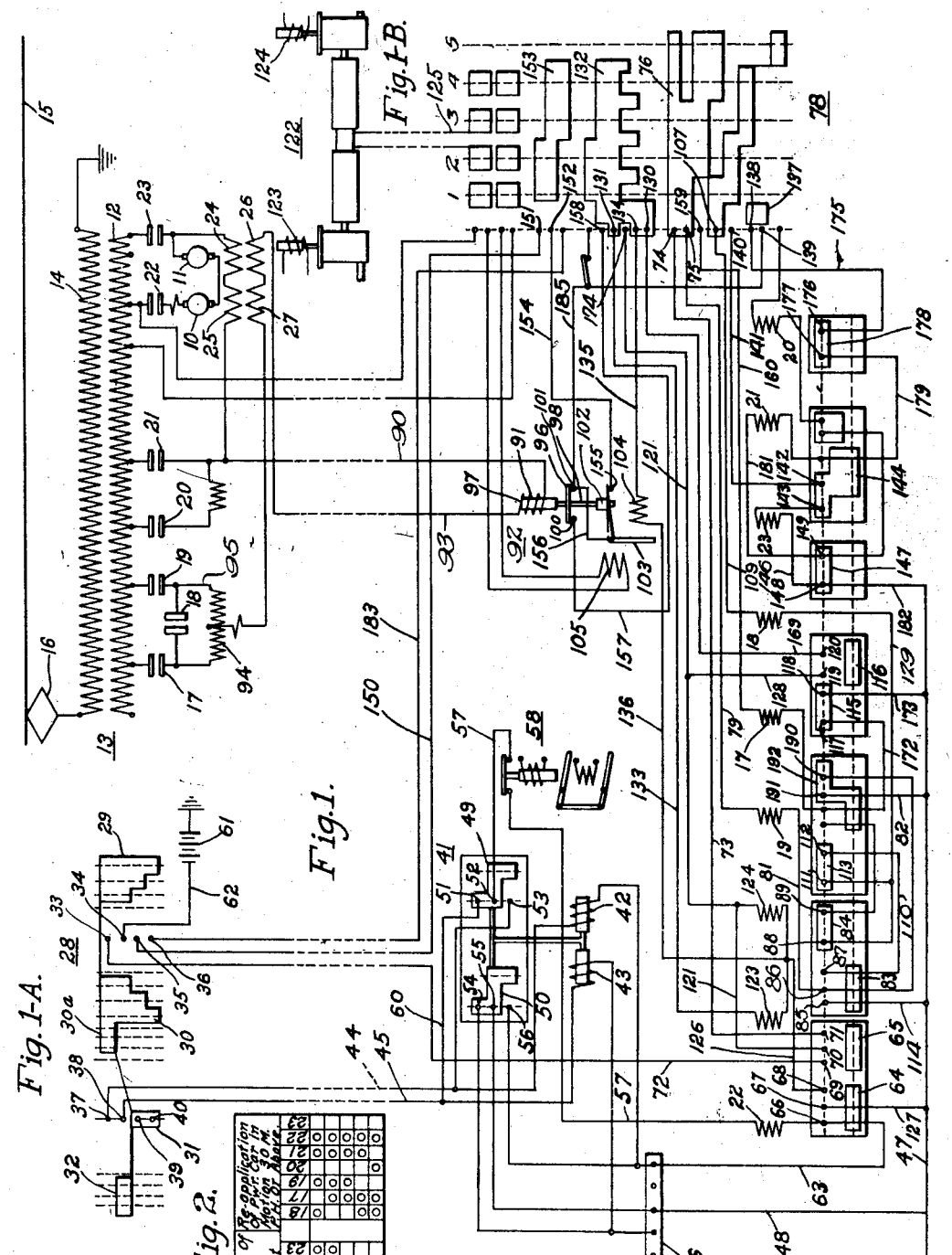

Patented Jan. 19, 1932

1,841,555

UNITED STATES PATENT OFFICE

WALTER H. SMITH, OF WILKINSBURG, PENNSYLVANIA, ASSIGNOR TO WESTINGHOUSE ELECTRIC & MANUFACTURING COMPANY, A CORPORATION OF PENNSYLVANIA

MOTOR CONTROL SYSTEM

Application filed September 24, 1926. Serial No. 137,509.

This invention relates generally to improvements in motor-control systems, and more particularly to motor-control systems in which the connections are changed during the operation of the motor.

In the operation of motors with repulsion connections, there has been considerable arcing upon the application of power to the motors when rotated mechanically at or above a predetermined speed. This results in injury to the commutator, and necessitates the continual re-conditioning of the motor, which greatly increases the cost of operation. Further, the maximum efficiency of the motor can not be maintained over any considerable period.

The object of this invention, generally stated, is the provision of a motor-control system which shall be simple and efficient in operation and readily and economically manufactured and installed.

A more specific object of the invention is to provide an improved motor-control system for the starting and accelerating of a motor with repulsion connections, and the operation of the motor, when it reaches a predetermined speed, with doubly-fed connections.

A further object of the invention is to provide for automatically changing the repulsion connections of a motor to doubly-fed connections when the motor rotates at a predetermined speed.

It is also an object of the invention to provide for the establishment of doubly-fed connections for operating the motor when power is applied to it and it is rotating at, or above, a predetermined speed.

Other objects of the invention will, in part, be obvious and, in part, appear hereinafter.

The invention is disclosed in the embodiment thereof shown in the accompanying drawings and comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description taken in conjunction with the accompanying drawings; in which:

Fig. 1 is a diagrammatic view of the preferred main circuits for supplying the traction motors of a railway vehicle from a power source.

Fig. 1—A is a diagrammatic view of the auxiliary or control circuits for governing the establishment of the motor circuits in accordance with this invention.

Fig. 1—B is a diagrammatic view of an air-engine of a well-known type that may be utilized for actuating the sequence-drum of the control circuit shown in Fig. 1—A.

Fig. 2 is a sequence chart showing the order in which the switches are closed.

Figure 3:
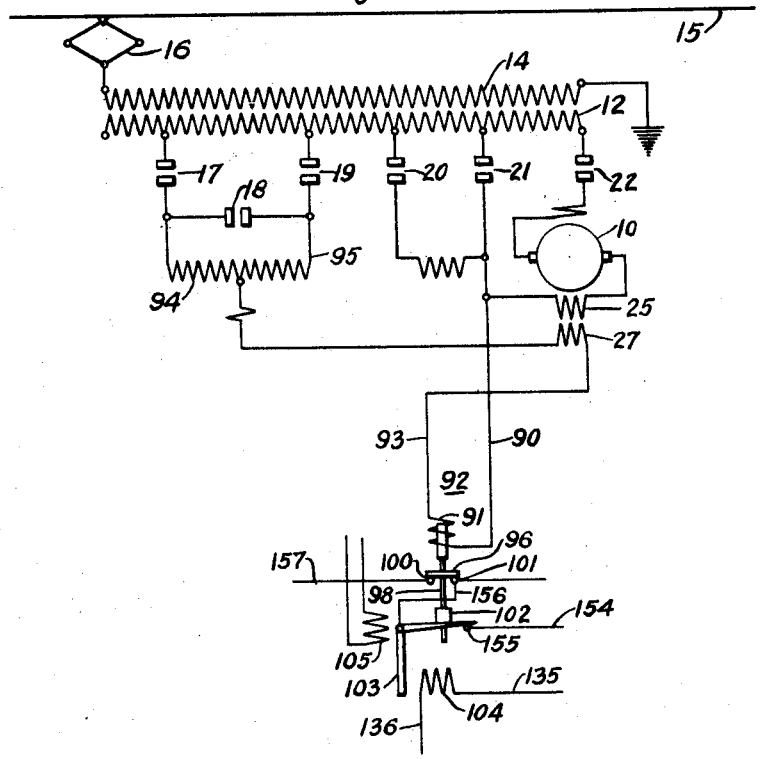
Fig. 3 is a diagrammatic view of the motor circuits for a single motor, showing the repulsion and doubly-fed connections for the field windings.

Referring now to the drawings, in Fig. 1 is illustrated the manner in which a plurality of motors 10 and 11 may be connected across the secondary winding 12 of a transformer 13 which, in this particular case, is the source of supply of electrical energy. As shown, the primary winding 14 of the transformer 13 is fed from an overhead trolley conductor 15 through a pantagraph 16.

Since one object of this invention is to start and accelerate the motor as a repulsion machine and to operate it, after it has gained a predetermined speed, as a doubly-fed machine, a plurality of switches 17 to 23, inclusive, are provided for making the desired repulsion and doubly-fed connections between the motors and the source of supply at different times.

The motors 10 and 11 may be of any well-known single-phase commutator type and are provided with main field windings 24 and 25 and auxiliary field windings 26 and 27. As shown, the field windings 24 to 27, inclusive, are connected in series relation with the armatures of the motors but it is to be understood that any other suitable arrangement of the field windings and armatures may be adopted.

In order to organize the control circuits shown in Fig. 1, a manually operated controller 28 of any well-known type is provided. As shown in Fig. 1—A, the controller 28 comprises a plurality of contact segments 29 to 32, inclusive, which are disposed for movement into engagement with a plurality of contact fingers.

The contact fingers are arranged in two groups 33 to 36, inclusive, and 37 to 40, inclusive. The contact fingers 33 to 36, inclusive, are disposed for engagement by the contact segments 29 to 30, according as the controller is operated in the forward or in the reverse direction. When the controller is moved in the forward direction, the contact segment 31 is withdrawn from the contact fingers 39 and 40, while the contact segment 32 is drawn into engagement with the contact finger 38. When the controller is moved in the reverse direction, to reverse the rotation of the motors, a projection 30—A that is provided on the contact segment 30, is moved into engagement with the contact finger 37.

Associated with the controller 28 is an auxiliary drum 41, which may be actuated to a forward or a reverse position by means of coils 42 and 43. As shown, the coils 42 and 43 are connected to the contact fingers 37 and 38 by conductors 44 and 45, respectively. These coils 42 and 43 are also connected to a negative conductor 47 through conductor 48.

In this construction, the auxiliary drum 41 is provided with contact segments 49 and 50. As shown, these contact segments are disposed to engage two groups of contact fingers 51 to 53, inclusive, and 54 to 56, inclusive. When the auxiliary drum is moved to its forward position, the contact segment 49 engages the contact fingers 51 and 52, while the contact segment 50 engages the contact fingers 54 and 55.

The contact finger 52 is connected, by means of a conductor 57, through an overload relay switch 58 to the actuating coil of switch 22. Further, the contact finger 51 is connected, by means of a conductor 60, to the conductor 45; so that, when the controller 28 is set in its forward position, current may flow to the actuating coil of the switch 22 from the battery source 61 which is connected to the contact finger 34 by a conductor 62.

Since the operation of the control circuit is similar for both forward and reverse operations, it is thought that it will be sufficient to trace the circuits that are established when the controller is actuated to its forward position. It is, therefore, considered unnecessary to explain and apply numerals to the conductors leading from the contact fingers of the auxiliary drum not already described, since they will take no part in the operation of the control circuits to be explained hereinafter, and such a procedure would only add to the complexity of the drawings.

The actuating coil of switch 22 is also connected by a conductor 63 to interlock 46. Two other interlocks 64 and 65 are provided in conjunction with the switch 22 and are disposed to engage two groups of contact fingers 66 to 68, inclusive, and 69 to 71, inclusive, respectively, when the switch is closed.

Assume now that the controller 28 is actuated to its third position in the forward direction, current then flows from the battery 61 through conductor 62, contact finger 34, contact segments 30, 30a and 32, contact finger 38, conductor 45, actuating coil 43, interlock 46 and conductor 48 to the grounded conductor 47. In this manner, the auxiliary drum 41 is actuated to its forward position.

When the contact segment 49 is moved into engagement with the contact fingers 51 and 52, the actuating circuit of the switch 22 is established. Current now flows from the energized conductor 45 through conductor 60, contact fingers 51 and 52, bridged by the contact segment 49, the overload relay switch 58, conductor 57, the actuating coil of the switch 22, conductor 63, interlock 46, and conductor 48 to the grounded conductor 47. Accordingly, the switch 22 is closed and the interlocks 64 and 65, carried by it, are moved into engagement with the groups of contact fingers 66 to 68, inclusive, and 69 to 71, inclusive.

The actuation of the interlocks 64 and 65 into engagement with their respective contact fingers closes the actuating circuit for the switch 19. Current now flows from the battery 61 through conductor 62, contact fingers 34 and 33, bridged by the contact segment 30, conductor 72, contact finger 69, interlock 65, contact finger 71, conductor 73, contact fingers 74 and 75, which are bridged by the contact segment 76 of the sequence drum 78, conductor 79, the actuating coil of the switch 19, conductor 81, contact fingers 190 and 191, bridged by interlock 192 and conductor 82 to the grounded conductor 47. Switch 19 is now closed, as shown in Fig. 2, and the two interlocks 83 and 84 carried by it are operated. As shown, the interlock 83 is moved into engagement with the contact fingers 85 to 87, inclusive, while the interlock 84 is moved out of engagement with the contact fingers 88 and 89.

As will be observed, the motor circuit is now closed, the motors 10 and 11 being connected across a portion of the secondary winding 12 of the transformer 13. The motor circuit may be traced as follows: from the transformer secondary winding 12, through switch 22, motors 10 and 11 in series relation, main field windings 24 and 25, conductor 90, the actuating coil 91 of a relay 92, conductor 93, auxiliary field windings 26 and 27, a portion of the preventive coil 94, conductor 95, and switch 19 to the transformer. This causes a considerable current to flow in the actuating coil 91 of the relay, but it is not sufficient to raise the contactor 96.

The relay 92 will be set forth in detail in my copending application, Serial No. 140,534, but in order that the operation of the control circuits may be more clearly understood, certain features of its construction will now be explained. As shown, the relay comprises a core 97, from which depends a shaft 98. In order to utilize the relay for controlling circuits, a contactor 96 is mounted in a predetermined position on the shaft and is disposed to engage contact members 100 and 101.

The actuating coil 91, already referred to, is associated with the core 97 for actuating the contactor 96. In order to restrict the operation of the relay through the energization of the actuating coil 91, a weight 102 is slidably mounted on the shaft 98. When in its lowermost position, the weight 102 is carried by the shaft 98 and is located only a short distance above the horizontal arm of a bell crank 103.

The lower arm of the bell crank is adapted to serve as an armature and is disposed in alinement with a coil 104. Accordingly, when the coil 104 is energized, the bell crank may be oscillated counter-clockwise to lift the weight 102 to cooperate with the actuating coil 91 in actuating the contactor 96.

In some cases, an auxiliary coil 105, which may be connected to any suitable source of supply, may be provided for retarding the operation of the bell crank. However, since the use of a coil, such as 105, does not change the operation of the control circuit, further description of it and its energization is considered unnecessary.

Upon the closure of the switch 19, another circuit is established which serves to energize the actuating coil of the switch 18. This circuit may be traced as follows: from battery 61, through conductor 62, contact fingers 34 and 33, bridged by the contact segment 30, conductor 72, contact fingers 69 and 71, bridged by the contact segment 65, conductor 73, contact fingers 74 and 107, bridged by the contact segment 108 of the sequence drum 78, conductor 109, actuating coil of the switch 18, conductor 129, contact fingers 111 and 112, bridged by interlock 113 of the switch 17, conductor 110, contact fingers 87 and 85, bridged by the interlock 83, and conductor 114 to the grounded conductor 47.

Therefore, the switch 18 is closed and the interlocks 115 and 116 mounted thereon are actuated to their "out" and "in" positions, respectively. As will be observed by reference to the drawings, the interlock 115 is disposed to engage the contact fingers 117 and 118, when the switch is open, and the interlock 116 to engage the contact fingers 119 and 120 when the switch is closed.

Closure of the switch 18 causes an increase in the voltage applied to the motor circuit and, therefore, an increase in the current energizing coil 91. However, in designing the members 97, 96 and the weight 102, they are made of sufficient weight to prevent operation of the relay by the normal current which will flow in the motor circuit when the switches 18, 19 and 22 are closed and the motor is rotating.

Upon the closure of the switch 18, another circuit is established which serves to energize the air-engine 122, shown in Fig. 1—B. As will be observed, the air-engine 122 is of a well-known type such as shown in Patent 1,229,543 and is provided with "off" and "on" valve-actuating coils 123 and 124, respectively. As in the usual construction, when both of the valve-actuating coils are energized, the engine operates in one direction, but, when both are de-energized, it moves in the other direction. If the "on" coil only is energized, the air-engine may be stopped in any desired position.

The air-engine is provided for operating the sequence drum 78. As shown schematically in the Figs. 1—A and 1—B, the air-engine is connected to the sequence drum by means of a shaft 125.

The circuits established upon the closure of the switch 18, which cooperate with the actuation of the air-engine, may be traced as follows: from the energized conductor 72, through contact fingers 69 and 70, bridged by the interlock 65 of switch 22, conductor 121, the "on" coil 124 of the air-engine, conductor 126, contact fingers 68 and 67, bridged by the interlock 64, and conductor 127 to the grounded conductor 47. The other coil 123 of the air-engine is connected in the circuit which extends from the energized conductor 72, through contact fingers 69 and 70, bridged by the interlock 65, conductor 121, conductor 128, contact fingers 119 and 120, bridged by the interlock 116, conductor 169, contact fingers 130 and 131, bridged by the contact segment 132, conductor 133, "off" coil 123 of the air-engine, conductor 126, contact fingers 68 and 67, bridged by the interlock 64, and conductor 127 to the grounded conductor 47.

Since both the valve-actuating coils 123 and 124 of the air-engine 122 are energized, it will immediately begin to move the sequence drum 78 forward. It will be observed that, when the sequence drum reaches its first position, the contact finger 130 is disengaged from the contact segment 132. Thus, coil 123 is deenergized while coil 124 remains energized, and the air-engine is brought to rest.

At the same time that the energizing circuits for the air-engine are established, another circuit is closed which serves to energize the coil 104 of relay 92. This circuit also leads from the energizing conductor 72 through contact fingers 69 and 70, bridged by the interlock 65, conductor 121, conductor 128, contact fingers 119 and 120, bridged by the interlock 116, conductor 169, contact fingers 130 and 134, bridged by the contact segment 132, conductor 135, coil 104, conductor 136, conductor 126, contact fingers 68 and 67, bridged by the interlock 64, and conductor 127 to the grounded conductor 47. Upon the energization of the coil 104, the bell crank 103 is rotated counter-clockwise, and the weight 102 is lifted.

As soon as the members 97 and 98 are relieved of the weight 102, they are actuated by the coil 91. Consequently, the contactor 96 is raised and the actuating coil of the switch 21 can not be energized therethrough when the contact segment 137 on the sequence drum is moved into engagement with the contact fingers 138 and 139.

When the sequence drum 78 reaches its first position, the circuit for energizing the actuating coil of switch 23 is completed. Again we start with the energizing conductor 72 and continue through the contact fingers 69 and 71, bridged by the interlock 65, conductor 73, contact fingers 74 and 140, which are bridged by the contact segment 76, conductor 141, contact fingers 142 and 143, bridged by interlock 144 on the switch 21, the actuating coil of the switch 23 and conductor 146 to the grounded conductor 47. The closure of the switch 23 increases the voltage applied to the coil 91 and raises the current to a value sufficient to effect the operation of the relay without the assistance of the relay coil 104.

The initial connections are now completed and the motors, which are connected across a section of the secondary winding of the transformer, operate as repulsion machines. As soon as the speed of the motor increases, the current flowing in the field windings is reduced to such a value that the coil 91 can not retain the contact member 96 in its raised position, and it is dropped to complete a circuit which serves to energize the actuating coils of the air-engine.

The switch 23 is provided with an interlock 147 that is disposed to engage contact fingers 148 and 149 when the switch is open. When the switch 23 is closed, the interlock 147 is moved out of engagement with the contact fingers 148 and 149.

The sequence drum remains in position 1 until the motors rotate at a sufficient speed to cut down the current flowing in the field windings 24 to 27, inclusive, and therefore, the current flowing in the actuating coil 91 of the relay 92. When the energization of the coil 91 is sufficiently decreased, it will permit the contactor 96 to drop into engagement with the contact members 100 and 101. This establishes a new energizing circuit for the "off" valve-actuating coil 123 of the air-engine 122.

The circuit thus established by means of the relay comprises the battery 61, conductor 62, contact fingers 34 and 35, bridged by the contact segment 30, conductor 150, contact fingers 151 and 152, bridged by the contact segment 153 of the sequence drum, conductor 154, contact member 155, the upper arm of the bell crank 103 of relay 92, conductor 156, contact members 101 and 100, bridged by the contactor 96, conductor 157, contact fingers 158 and 131, bridged by the contact segment 132, conductor 133, the actuating coil 123, conductor 126, contact fingers 68 and 67, bridged by the interlock 64, and conductor 127 to the grounded conductor 47. The energizing circuit of the "on" valve-actuating coil 124 was not broken during the first step of movement of the sequence drum, and so the two valve-actuating coils are now energized and the sequence drum moves forward from position 1 toward position 2.

It will be noted that, as the sequence drum progresses from position 1 to position 2, the contact finger 107 is disengaged from the contact segment 76, thereby deenergizing the actuating coil of the switch 18. This action causes the interlock 115 to engage the contact fingers 117 and 118.

The contact finger 159 is engaged by the contact segment 76 when the drum 78 is moved from position 1 to position 2 and an energizing circuit for the switch 17 is closed. Current now flows from the energizing conductor 72 through contact fingers 69 and 71, bridged by the interlock 65, conductor 73, contact fingers 74 and 159, bridged by the contact segment 76, conductor 160, actuating coil of the switch 17, conductor 172, contact fingers 117 and 118, bridged by the contact segment 115, and through conductor 173 to the grounded conductor 47. Therefore, switch 17 is closed.

It will be noted that, as the sequence drum 78 moves from position 2 to position 3, the contact finger 140 is disengaged from the contact segment 76. Thus, the energizing circuit of the switch 23 is opened and the interlock 147 is actuated to bridge contact fingers 148 and 149.

Further, as the sequence drum progresses from position 2 to position 3, contact finger 138 is engaged by the contact segment 76. This closes a circuit leading from the energized conductor 72 through contact fingers 69 and 71, bridged by the interlock 65, conductor 73, contact fingers 74 and 138, bridged by the contact segment 76, conductor 175, contact fingers 176 and 177, bridged by the interlock 178, conductor 179, actuating coil of switch 21, conductor 181, contact fingers 149 and 148, bridged by the interlock 147, and conductor 182 to the grounded conductor 47. Consequently, when the above circuit is energized, the switch 21 is closed, thereby bringing about the establishment of the doubly-fed motor connections.

The motors are now energized by two circuits. It will be seen that one circuit extends from the secondary winding 12 of the transformer, through switch 22, the armatures of motors 10 and 11, main field windings 24 and 25, conductor 90, relay coil 91, conductor 93, auxiliary field windings 26 and 27, the preventive coil 94 and switches 17 and 19, to the transformer. The other circuit extends from the secondary winding 12, through switch 22, the armatures of the motors 10 and 11, main field windings 24 and 25, to the secondary winding 12 through switch 21.

The movement of the sequence drum from position 2 to position 3 is effected by substantially the same circuit as brought about the movement from position 1 to position 2, with the exception that the conductor 183, instead of the conductor 150, is connected between the contact segments 153 and the battery 61. This circuit is established when the current flowing in the coil 91 is reduced by the counter-electromotive force developed in the motors as the speed increases, so as to permit the closure of the contact member 96.

The starting and accelerating of the motors with repulsion connections and the establishment of doubly-fed connections for the normal starting of the motors from rest, is as described above. However, when motors of this type are used for operating vehicles, it is often desirable to cut off the power when the vehicle is coasting and the motors are being driven mechanically, so as to conserve energy. If occasion demands that the power be re-applied when the vehicle is still coasting and the motors are rotating at a predetermined speed, provision is made for re-establishing the doubly-fed connections only, thereby to prevent arcing and injury to the commutator.

Assume now that the vehicle is moving, and that the operator has manipulated the controller to cut off the supply of electrical energy, which effects the de-energization of the valve-actuating coils 123 and 124, so that the air-engine 122 returns the sequence drum 78 to its "off" position. Under such conditions, the switches 17 to 23, inclusive, are opened and the motors are completely disconnected from the transformer 13.

If it becomes necessary, to re-apply power while the vehicle is still coasting at a speed which, for this particular apparatus, is about thirty miles per hour, a number of circuits will be re-established when the master controller 28 is thrown to its third position. The actuating circuits for the switches 22, 19 and 18 will be the same as those established for the initial starting and accelerating of the motor, with the repulsion connections described hereinbefore. In addition to these circuits, new circuits will be established for effecting the closure of the switch 21 to immediately bring about the establishment of the doubly-fed connections.

When the motors are being driven mechanically at a predetermined speed, an electromotive force is developed which, upon the re-application of power to the motors, prevents the building up of a current in the motor circuit sufficient to effect the energization of the coil 91 to a value equal to that required to actuate the contactor 96. Consequently, the circuit through the relay, which serves to energize the actuating coil of the switch 21, is closed.

As will be readily understood from the description already given, when the switches 18, 19 and 22 have been closed, circuits are established for the energization of the valve-actuating coils 123 and 124. Accordingly, the air-engine will function to move the sequence drum 78 forward.

As the sequence drum moves from its "off" position toward its first position, a circuit is established from the energized conductor 72, through contact fingers 69 and 70, bridged by the interlock 65, conductor 121, contact fingers 174 and 158, bridged by the contact member 132, conductor 157, contact fingers 100 to 101 bridged by contactor 96, conductor 185, contact fingers 138 and 139, bridged by the contact segment 137, conductor 175, contact fingers 176 and 177, bridged by the interlock 178, conductor 179, actuating coil of the switch 21, conductor 181, contact fingers 149 and 148, bridged by the interlock 147, and conductor 182 to the grounded conductor 47. In this manner, the switch 21 is closed to establish the doubly-fed connections as the sequence drum moves from its "off" position to its first position.

It will be noted that, as the sequence drum moves from its "off" position to its first position, the contact fingers 138 and 139 are disengaged from the contact segment 137, thus interrupting the energizing circuit for the switch 21. However, as described above, before the circuit traced for actuating switch 21 is broken, the contact finger 140 is engaged by the contact segment 76, and a holding circuit is established for maintaining the switch 21 closed. This circuit extends from the energized conductor 72, through contact fingers 69 and 71, bridged by the interlock 65, conductor 73, contact fingers 74 and 140, bridged by the contact segment 76, conductor 141, contact fingers 142 and 186, bridged by the interlock 144, conductor 179, actuating coil of switch 21, conductor 181, contact fingers 149 and 148, bridged by the interlock 147, and conductor 182, to the grounded conductor 47.

This holding circuit was made possible by the actuation of the interlock 144 into engagement with contact fingers 185 and 186, which action was effected by the closure of the switch 21.

It will be noted that, when the master controller 28 was thrown to its "on" position, the circuit for energizing the coil 104 was established in the same manner that it was established during the initial starting of the motor from rest with repulsion motor connections. The energization of the coil 104 effects the operation of the bell crank 103 to lift the weight 102. However, when the motors are mechanically rotated at a high speed, the electromotive force developed prevents the flow of sufficient current in the coil 91 to operate the relay contactor 96 even when relieved of the weight 102.

It will, therefore, be seen that, when the master controller 28 is actuated, the switches 18, 19, 21 and 22 are closed to establish doubly-fed connections, if the motors are being rotated mechanically at a predetermined speed, but to establish repulsion connections if the motors are at rest.

Since numerous changes may be made in the above described construction and arrangement of parts and different embodiments of the invention may also be made without departing from the scope thereof, it is intended that all matter contained in the above description or shown in the accompanying drawings shall be interpreted as illustrative and not in a limiting sense.

I claim as my invention:

1. In a motor control system in combination, a source of power, a motor, manually operable control means for effecting the connection of the motor to the source of power, control means responsive to the operation of said manual control means for connecting the motor to the power source to start it as a repulsion motor and operate it as a doubly-fed motor, and a relay disposed to stand inactive when the motor is rotating above a predetermined speed to permit the establishment of doubly-fed motor connections, when the manually operable control means is actuated.

2. In a motor control system in combination, a power source, a motor, a plurality of switches for connecting the motor to the power source to operate it either as a repulsion motor or a doubly-fed motor, a sequence drum disposed for operation to control the switches provided for establishing the doubly-fed connections, said sequence drum being adapted to establish the doubly-fed connections in its first operating and other predetermined positions, means responsive to motor currents for preventing the sequence drum from establishing connections for operating the motor as a doubly-fed machine when in its first position if the motor is being started from rest, said preventive means being disposed to stand inactive when the motor is operating at a predetermined speed thereby permitting the establishment of the doubly-fed motor connections when the sequence drum is actuated to its first operating position to effect the connection of a mechanically driven motor to the power source.

3. In a motor control system in combination, a power source, a motor disposed to be connected to the power source, control means comprising manually operable means, a sequence drum, means for actuating the sequence drum and means responsive to the operation of the manual means and the sequence drum for connecting the motor to the power source to operate it as a repulsion motor or a doubly-fed motor, said sequence drum being disposed to establish doubly-fed motor connections when actuated to its first operating position and a relay responsive to motor currents disposed to prevent the establishment of doubly-fed connections for the motor when the motor is started from rest and disposed to stand inactive when the motor is rotating at or above a predetermined speed, thereby to permit the establishment of doubly-fed connections by the use of said manually operable means.

4. In a motor control system in combination, a power source, a motor disposed to be connected to the power source, control means comprising manually operable means, a sequence drum, means for actuating the sequence drum and means responsive to the operation of the manual means and the sequence drum for connecting the motor to the power source to operate it as a repulsion motor or a doubly-fed motor, said sequence drum being disposed to establish doubly-fed motor connections when actuated to its first operating position and a relay responsive to motor currents disposed to prevent the establishment of doubly-fed connections for the motor when the motor is started from rest, said relay being disposed to stand inactive if the motor is operating at a predetermined speed, thereby to permit the establishment of the doubly-fed connections by the operation of the manually actuated control means.

5. In a motor-control system, in combination, a power source, a motor, a controller for governing the operations of the motor, means cooperative with the controller to establish repulsion connections to start the motor, said means being disposed to stand inactive when the controller is actuated to establish motor connections and the motor is rotating at a predetermined speed.

6. In a motor-control system, in combination, a source of power, a motor, a controller for effecting the connection of the motor to the source of power, means disposed to cooperate with the controller to establish doubly-fed motor connections when the controller is actuated from its "off" position and the motor is rotating above a predetermined speed, and a relay disposed to cooperate with the controller to establish repulsion motor connections when the controller is actuated from its "off" position and the motor is at rest, said relay being disposed to stand inactive when the motor is rotating at a predetermined speed.

7. In a motor-control system, in combination, a motor, a source of power for the motor, a controller for connecting the motor to the source of power, control means disposed to respond to the operation of the controller to establish repulsion connections for starting and accelerating the motor, and a relay cooperative to establish doubly-fed connections when the motor has reached a predetermined speed, said relay being disposed to stand inactive when the motor rotates at said predetermined speed and the controller is actuated to interrupt and reestablish connections to the source of power.

In testimony whereof, I have hereunto subscribed my name this 8th day of September, 1926.

WALTER H. SMITH.